Mar. 27, 1923.
R. GOLDSCHMIDT
1,450,072
MECHANISM FOR PRODUCING OSCILLATIONS FROM ROTARY MOTION
Filed Jan. 29, 1921
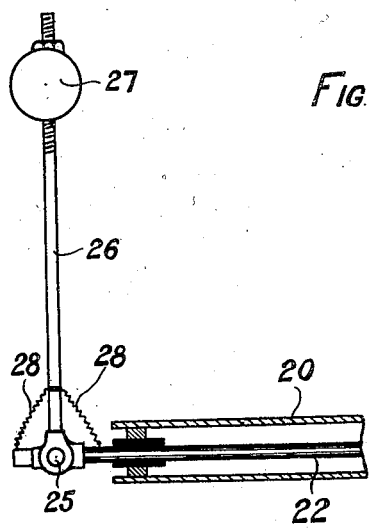
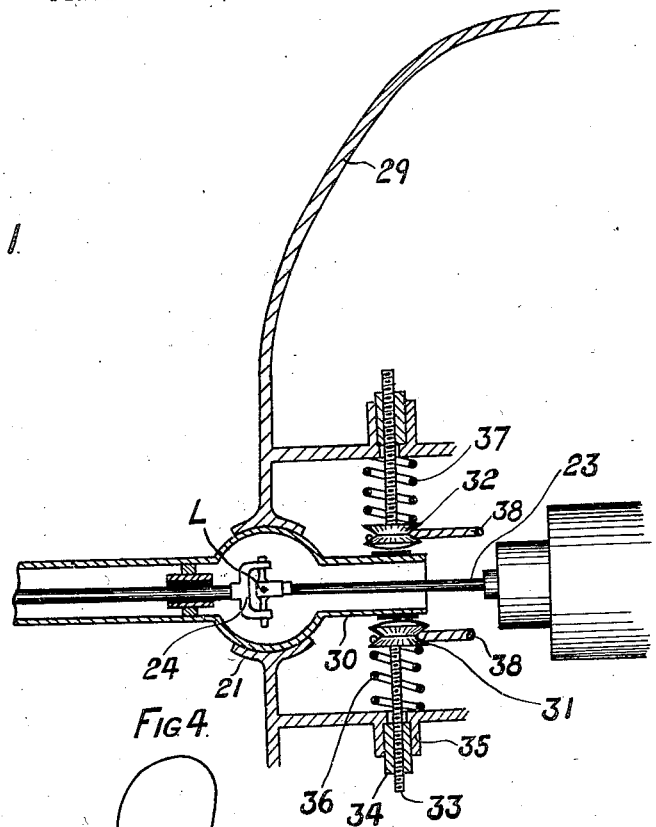
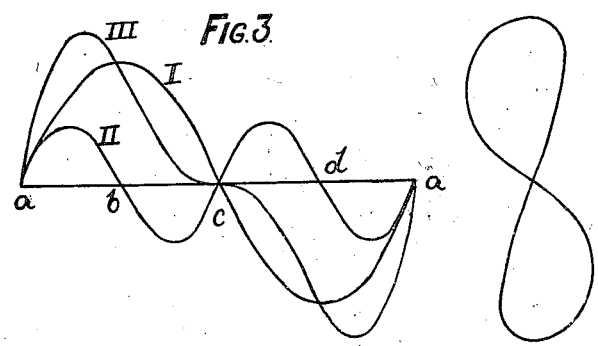
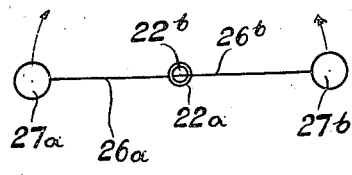
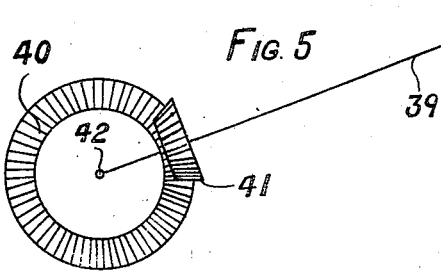
Inventor.
Rudolf Goldschmidt,
By Watson, Cait, Morse & Grindle,
Attorneys.

Patented Mar. 27, 1923.

1,450,072

UNITED STATES PATENT OFFICE.

RUDOLF GOLDSCHMIDT, OF WEST END, BERLIN, GERMANY, ASSIGNOR TO DET TEKNISKE FORSÖGSAKTIESELSKAB, OF CHARLOTTENLUND, DENMARK, A COMPANY OF DENMARK.

MECHANISM FOR PRODUCING OSCILLATIONS FROM ROTARY MOTION.

Application filed January 29, 1921. Serial No. 441,099.

*To all whom it may concern:*

Be it known that I, RUDOLF GOLDSCHMIDT, a German citizen, residing at 45 Linden Allee, West End, Berlin, Germany, have invented new and useful Improvements in Mechanism for Producing Oscillations from Rotary Motion, of which the following is a specification.

This invention relates to mechanism for producing oscillation from rotary motion and has for its object to provide mechanism for oscillating the vibratory wings of an ornithopter or like flying machine having vibratory wings.

According to the present invention a rotatable shaft, on which is centrifugally and pivotally mounted a weight or weights, is carried by the wing and preferably oscillates about the pivot of the wing.

In order that the invention may be clearly understood reference is hereinafter made to the accompanying drawings whereon:

Fig. 1 illustrates one form of the improved mechanism applied to the wing of an ornithopter flying machine.

Fig. 2 is a diagrammatic view showing two centrifugal weights.

Fig. 3 is a force diagram hereinafter referred to.

Fig. 4 illustrates one form of oscillation produced by the improved mechanism.

Fig. 5 is a diagrammatic view of a modified form of mechanism applied to the wing of an ornithopter.

Referring to Fig. 1 of the drawings, 20 illustrates the main spar of a flapping wing of a flying machine, mounted in a universal bearing 21 and through which passes a shaft 22 driven by a driving shaft 23 through a universal coupling 24 or the like. Jointed to the outer end of the shaft 22 at 25 is an arm 26 carrying a weight 27. The arm 26 is driven by the shaft 22 and the centrifugal force of the weight 27 causes oscillation of the wing spar 20. The actuation of the wing at 25 involves little stress on the construction, as the centrifugal forces act at the most favourable point on the wing whilst, at the same time, this construction enables forces to be transmitted to the wing at a point very difficult of access. The weight 27 need only be a small fraction of the total weight of the wing.

The shaft 22 may be mounted in any convenient manner on the wing and instead of jointing the arm 26 to the outer end of the shaft 22, one or more centrifugal weights may be disposed at any suitable distance from the coupling 24 or distributed over the span of the wing.

The curvilinear motion of the joint 25 in Fig. 1 is a part of a spherical surface of centre L. In order to avoid gyroscopic stresses, it may be desirable to use a universal joint or fork joint at 25 so as to permit the weight 27 to maintain its plane of rotation and the arm 26 may be kept normally at right angles to the shaft 22 by springs 28 or their equivalent.

The employment of a single centrifugal weight as indicated in Fig. 1 would tend to set up unbalanced forces and, if desired, therefore, a pair of centrifugal weights may be employed as in Fig. 2, which illustrates a pair of centrifugal weights $27^a$ and $27^b$, the centrifugal weight $27^a$ being carried by an arm $26^a$ on an outer hollow shaft $22^a$, whilst the centrifugal weight $27^b$ is carried by an arm $26^b$ driven by an inner shaft $22^b$ projecting beyond the outer shaft $22^a$. When one centrifugal weight 27 is employed as in Fig. 1, or if two centrifugal weights $27^a$ and $27^b$ as in Fig. 2 of different turning moments are employed and the wing moves with the body 29 of the flying machine in a direction at right angles to the plane of oscillation of the wing, then, under the centrifugal action, the joint 25 will describe a curved path which is more or less elliptical. The form of this path may be varied by varying the relative moments of the pair of centrifugal weights $27^a$ and $27^b$.

If centrifugal weights $27^a$ and $27^b$ are caused to rotate at different angular velocities, a force diagram similar to that of Fig. 3 will be obtained, wherein the curve I of single frequence represents the force diagram of one centrifugal weight and the curve II of double frequence represents the force diagram of the other centrifugal weight when rotating at twice the angular velocity of the first one, thereby producing the resultant curve III. It will be seen that, in the quadrant $a$—$b$, the accelerating forces are great as compared with the accelerating forces in the opposite quadrant $c$—$d$, where acceleration takes place, in the negative direction.

In order to cause the wing tip to describe a lemniscate path as in Fig. 4, similar to the action of the wing tip of many birds, where the difference in direction between the wing chord and direction of motion is great during the working stroke, but small on the return stroke one of the centrifugal weights may be rotated at a different angular velocity to the other of the pair of weights to produce a force diagram such as that described with reference to Fig. 3.

As illustrated in Fig. 1 the wing spar 20 is preferably continued inwardly at 30 beyond the journal 21, the inner extension 30 being adapted to abut against buffers 31 and 32 adapted to determine the location of the path of oscillation of the wing.

It will be seen that the buffers 31 and 32 determine the location of the path of reciprocation in the plane of the paper and that similar buffers may also be employed to determine the path of reciprocation in a plane at right angles thereto.

The buffers 31 and 32 are preferably adjustable, for which purpose they may be mounted on screwed spindles 33 threaded through nuts 34 fitting loosely in guides 35 fixed to the body 29, the buffers being controlled by springs 36 and 37 respectively. The buffers may be rotated by cords 38 so as to thread the spindles 33 further into or out of the nuts 34 whilst the latter enable the buffers to yield under the pressure of the extension 30 of the wing spar. The buffers 31 and 32 can thus be readily adjusted to vary the path of oscillation of the wing spar 20.

The direction of the oscillations of the wing spar 20 in relation to the body 29 of the flying machine, may be varied by rotation of the wing spar 20 within the journal 21, thus adjusting the normal plane of oscillation relative to the body 29.

Alternatively, where a pair of centrifugal weights are employed as in Fig. 2, the normal plane of oscillation of the wing may be varied by altering the relative phases of the two centrifugal weights. This may be effected, for example, by setting the two weights at an angle to each other, instead of diametrically opposite each other as in Fig. 2 or by rotating the weights at different angular velocities.

In order to produce oscillations in which the velocity in one direction differs from the velocity in the other direction, the mechanism may be of the form illustrated diagrammatically in Fig. 5, in which the shaft 39 is rotated by bevel gearing 40 and 41, the axis 42 of the gear wheel 40 corresponding to the point L of Fig. 1 about which the wing swings, so that, during oscillation of the shaft 39, the gear wheel 41 will roll upon the gear wheel 40 and this rolling motion will be added to or subtracted from the angular velocity at which the shaft 39 is driven from the gear wheel 40 according to the direction of oscillation. The same effect may be obtained by the use of any other equivalent mechanism.

In the mechanism described an impulse may be impressed upon the reciprocatory member if the latter abuts against the buffer or buffers before it completes its amplitude of vibration in one or other direction, the buffers in such case acting upon the reciprocatory member only during a fraction of its travel.

In order to avoid shocks or vibrations in the wing, it may be desirable to provide a spring or springs adapted to act upon the reciprocatory member or wing spar during the whole of its travel. The spring or springs are preferably normally under strain, either in tension or compression, so that further extension or compression of the spring will not materially affect the force exerted by the spring on the wing spar.

Although in some cases it may be sufficient to provide a spring on one side only of the wing spar a spring may, if desired, be fitted at each side of the wing spar so as to more efficiently control the latter.

In Fig. 1, two springs 36 and 37 are provided and by adjusting the buffer spindles 33 within the nuts 34, the buffers 31 and 32 may be adjusted so that they bear constantly against the inner extension 30 of the wing spar, under the pressure of the springs 36 and 37.

By this arrangement, the flying machine will not only be supported during the downstroke of the wings, but will also be supported during the upstroke, owing to the fact that, during the upstroke, the centrifugal weight 27 will describe the upper portion of its path of rotation and consequently have an upward tendency, which being counter-acted by the spring 36, will tend to lift the journal 21 and thus support the whole machine.

In order to avoid vibration of the wings, it is desirable to give the springs 36 and 37 an initial compression and to make the springs of such a nature that the extension or compression of the springs will not materially affect the forces exerted thereby. By this means also the counteraction of the spring 36 to movement of the wing spar whilst the weight 27 describes the upper portion of its rotary path will be increased and thus assist the supporting of the flying machine. The spring 36 will also assist the initial downstroke of the wing.

Claims.

1. In a flying machine having vibratory wings, a driving shaft rotatably mounted on the body of the machine, a driven shaft carried by the vibratory wing and jointed at its inner end to said driving shaft and a weight eccentrically and pivotally carried by said driven shaft.

2. Mechanism for producing oscillation from rotary motion comprising inner and outer rotatable swinging members, a weight eccentrically and pivotally mounted on each of said members and means for individually rotating said members.

3. Mechanism as specified in claim 2 in which the weights are rotated at different angular velocities.

4. Mechanism as specified in claim 2 in which the relative phases of the weights may be varied by varying the normal angle between the weights.

5. A flying machine according to claim 1, in which the driving connection between the driving and driven shafts comprises a driving wheel on the driving shaft and a driven wheel on the driven shaft, the driven wheel rotating with the driven shaft and rolling on the driving wheel during swinging of the driven shaft about its joint, whereby the angular velocity of said driven shaft varies during each swing.

6. Mechanism for producing oscillations from rotary motion comprising a shaft member pivotally mounted at a point on its length, an arm jointed to said shaft member, a weight carried by said arm, means for rotating said shaft member, a casing surrounding said shaft member, a journal for said casing concentric with the pivotal point of said shaft member, an extension of said casing beyond the pivotal point and means for resiliently and adjustably limiting the oscillations of said extension.

7. Mechanism for producing oscillations from rotary motion comprising a shaft member pivotally mounted at a point in its length, an arm jointed to said shaft member, a weight carried by said arm, means for rotating said shaft member and resilient means for normally retaining said arm at right angles to said shaft member.

8. In a flying machine having vibratory wings, mechanism for producing oscillation of the wing comprising a shaft member carried by the wing and pivotally mounted on the body of the machine coincident with the centre of swing of the wing, a weight eccentrically jointed to said shaft member and means for rotating said shaft member.

9. In a flying machine having vibratory wings, a hollow wing spar journalled in the body of the flying machine and having an inner extension, a shaft member within said wing spar, means for rotating said shaft member, a weight eccentrically carried by and rotated by said shaft member and spring buffers adapted to abut against the inner extension of said wing spar.

10. In a flying machine according to claim 9, means for adjusting the buffers in a direction substantially at right angles to the inner extension of the wing spar.

RUDOLF GOLDSCHMIDT.